(12) United States Patent
Cao et al.

(10) Patent No.: US 12,536,409 B2
(45) Date of Patent: Jan. 27, 2026

(54) MASSIVE DATA-DRIVEN METHOD FOR AUTOMATICALLY LOCATING MINE MICROSEISMIC SOURCE

(71) Applicant: China University of Mining and Technology, Xuzhou (CN)

(72) Inventors: Anye Cao, Xuzhou (CN); Changbin Wang, Xuzhou (CN); Xu Yang, Xuzhou (CN); Yaoqi Liu, Xuzhou (CN); Sen Li, Xuzhou (CN); Qiang Niu, Xuzhou (CN); Linming Dou, Xuzhou (CN)

(73) Assignee: China University of Mining and Technology, Xuzhou (CN)

( * ) Notice: Subject to any disclaimer, the term of this patent is extended or adjusted under 35 U.S.C. 154(b) by 612 days.

(21) Appl. No.: 18/078,708

(22) Filed: Dec. 9, 2022

(65) Prior Publication Data

US 2024/0078413 A1     Mar. 7, 2024

(30) Foreign Application Priority Data

Aug. 24, 2022   (CN) .......................... 202211019011.5

(51) Int. Cl.
*G06N 3/0464*     (2023.01)
*G06N 3/047*      (2023.01)

(52) U.S. Cl.
CPC ........... *G06N 3/0464* (2023.01); *G06N 3/047* (2023.01)

(58) Field of Classification Search
CPC ........ G01V 1/282; G01V 1/362; G06N 3/047; G06N 3/0464
See application file for complete search history.

(56) References Cited

FOREIGN PATENT DOCUMENTS

CN            110210296 A    *   9/2019   ............... G01V 1/30

OTHER PUBLICATIONS

Feng, Qiang, et al. "Microseismic source location using deep reinforcement learning." IEEE Transactions on Geoscience and Remote Sensing 60 (2022): 1-9. (Year: 2022).*
CN110210296A Translation (Year: 2019).*

* cited by examiner

*Primary Examiner* — Schyler S Sanks
(74) *Attorney, Agent, or Firm* — Cooper Legal Group, LLC

(57) ABSTRACT

Disclosed is a massive data-driven method for automatically locating a mine microseismic source, including: constructing a microseismic wave calibration data set by using a large-scale seismic data set containing seismic signals and non-seismic signals; constructing a pre-training calibration model based on a full convolution neural network through deep learning of a seismic wave calibration data set; using microseismic data of mine sites for transfer learning of an initial arrival time calibration model to construct an arrival time automatic calibration model suitable for mine microseismic signals; and automatically as well as accurately locating mine microseismic events based on an isokinetic homogeneous isotropic velocity model by using an optimization algorithm to deduce arrival time errors and through repeated iteration and fine-tuning.

8 Claims, 8 Drawing Sheets

MASSIVE DATA-DRIVEN METHOD FOR AUTOMATICALLY LOCATING MINE MICROSEISMIC SOURCE

CROSS-REFERENCE TO RELATED APPLICATIONS

This application claims priority to Chinese Patent Application No. 202211019011.5, filed on Aug. 24, 2022, the entire contents of which are incorporated herein by reference.

TECHNICAL FIELD

The present application generally relates to mine IntelliSense, and in particular to a massive data-driven method for automatically locating a mine microseismic source.

BACKGROUND

Microseismic monitoring technology is a real-time, dynamic and continuous geophysical monitoring method for evaluating structures and stability of rock mass based on seismology by analyzing microseismic events caused by deformation and destruction of the rock mass during underground space operations. Since the microseismic monitoring technology has many advantages such as a wide detection range, rich detection information and low labor intensity, it has been widely used in underground engineering fields like tunneling, petroleum, mining, terrestrial heat and nuclear waste storage.

However, as the most important mean of the microseismic monitoring technology, microseismic event location has problems of large errors and low location accuracy in underground engineering applications. These problems are effectively solved in prior arts, and greatly limits application and development of the microseismic monitoring technology. Accurate primary wave (P-wave) arrival picking plays an important role in the microseismic event location, but it is difficult to accurately calibrate P-wave arrival times due to variable microseismic monitoring environments of underground engineering and complex propagation paths, great influence of noise and interference signals on microseismic waves and complicated waveforms. In addition, due to complex wave velocity structures in underground space, it is necessary to manually fine-tune arrival times of waveforms received by each sensor repeatedly so as to accurately locate the microseismic events by minimum residual errors between theoretical values and observed values, which significantly increases time for the microseismic event location. Therefore, how to effectively and precisely pick the P-wave arrival times and quickly and accurately locate the microseismic events according to characteristics of the underground engineering environments is of great importance to enhance the location accuracy and improve the microseismic monitoring technology.

At present, the microseismic P-wave arrival times in the underground engineering fields are mainly calibrated by using automatic algorithms calibration in conjunction with manual calibration. Commonly used automatic calibration algorithms utilize single or multiple characteristic indexes to identify the P-wave arrival times, such as a Short-Term to Long-Term Average (STA/LTA) method, a Modified Energy Ratio (MER) method, a Modified Copon Method (MCM) method, an Akaike Information Criterion (AIC) method, and so on. The above-mentioned automatic calibration algorithms have the high accuracy for the waveforms with high signal-to-noise ratios (SNRs) and simple structures. However, due to complex waveform information, the single or multiple characteristic indexes used by the above-mentioned methods are difficult to describe all the characteristics of all kinds of the microseismic waveforms completely. Therefore, for microseismic signals with the low SNRs and the complex waveforms in the underground engineering environments, calibration accuracy and robustness of the P-wave arrival times by the above algorithms is obviously decreased, and in most cases, the P-wave arrival times need to be recalibrated manually. Although the manually calibrated P-wave arrival times are reasonable, calibration results are uneven in qualities due to different professional levels of technicians, and are easily influenced by subjective factors. Moreover, the calibration accuracy and efficiency gradually decrease with increase of working time in repetitive labor. Above factors lead to unstable manual calibration quality of the microseismic wave arrival times and microseismic location errors that may not be estimated.

In recent years, deep learning technology using massive data as training samples has developed rapidly and made remarkable technical achievements in a seismology field, and thus provides new technical ideas for automatic calibration of the microseismic wave arrival times and microseismic event location. Different from the traditional automatic calibration algorithms of seismic wave arrival times, the deep learning technology does not depend on the single or multiple characteristic indexes, but resolves waveform signals into a high-dimensional matrix without artificially extracting parameters, and then establishes a mapping relationship between high-dimensional data by simulating use of neurons in human brain, so as to retain all information features of seismic waves to a maximum extent. As millions of seismic data sets provide extensive data support for the deep learning technology and provide a great research space, a trained deep learning model shows incomparable advantages over the traditional algorithms and the manual analysis methods in the accuracy and sensitivity of the seismic wave arrival time calibration.

SUMMARY

An objective of the application is to provide a massive data-driven method for automatically locating a mine microseismic source, which may accurately pick the P-wave arrival times, automatically and intelligently locate microseismic events, and improve location accuracy of the microseismic events and microseismic monitoring efficiency.

To achieve the above objective, the present application adopts the following technical schemes.

A massive data-driven method for automatically locating a mine microseismic source, including:

S1: screening labeled seismic waveform data from a large-scale seismic data set STEAD containing seismic signals and non-seismic signals, and preprocessing each seismic waveform datum to construct a seismic wave calibration data set;

S2: randomly dividing the seismic waveform data in the seismic wave calibration data set into a training set, a verification set and a test set according to a preset proportion; then, establishing a deep neural network model based on a U-net structure; and training the deep neural network model by the training set to obtain a pre-training calibration model, in which the deep neural network model has four down-sampling phases and four up-sampling phases; the down-sampling phases are used to extract effective wave characters for arrival time calibration from original seismic data, the up-sampling phases are used to expand the wave characters and convert the wave characters into probability distribution of each P-wave arrival time, each S-wave arrival time and noise at each data point, and layers corresponding to the down-sampling phases and layers corresponding to the up-sampling phases are connected by jumps;

a size of convolution kernel is set to 7 and a step size of the convolution kernel is set to 4; in convolution operation, padding is performed before and after each layer, so that input sequences and output sequences have a same length, in a last layer of the deep neural network model, probabilities of the P-wave arrival times, the S-wave arrival times and the noise are output by a formula (1) and a Softmax normalized exponential function, in which a cross entropy loss function is used for training the deep neural network model by the training set, and a formula (2) is used for training the deep neural network model as well as the cross entropy loss function is ensured to be minimal;

$$q_i(x) = \frac{e^{z_i(x)}}{\sum_{k=1}^{3} e^{z_k(x)}}, \quad (1)$$

where i are set to 1, 2, 3, representing the noise, the P-wave arrival times as well as the S-wave arrival times, and Z(x) is unscaled values of the last layer;

$$H(p, q) = -\sum_{i=1}^{2}\sum_{x} p_i(x) \log q_i(x), \quad (2)$$

where p(x) is real probability distribution and q(x) is predictive probability distribution;

S3: using microseismic data of mine sites for transfer learning of the pre-training calibration model, and constructing an arrival time automatic calibration model suitable for mine microseismic signals to adapt to microseismic wave characters of underground engineering, including:

S31: manually labeling part of samples in the microseismic data of the mine sites, and constructing a microseismic signal sample data set containing the P-wave arrival times and the S-wave arrival times;

S32: constructing Gaussian distribution mask around manually labeled points by using a formula (3) to reduce impacts of mislabeling in the microseismic signal sample data set;

$$P(x) = \begin{cases} \frac{1}{\sigma\sqrt{2\pi}} e^{-\frac{(x-\mu)^2}{2\sigma^2}}, & |x-\mu| \le d \\ 0, & |x-\mu| > d \end{cases} \quad (3)$$

where x is data points, μ is a manually labeled location of the arrival times, σ is a standard deviation and is set to $1/\sqrt{2\pi}$, and 2d is a label width;

S33: performing a data augmentation process on a microseismic wave calibration data set to obtain augmented data set samples; then, increasing complexity of the data set samples by using random shifting and signal stacking; and finally, performing the transfer learning of the pre-training calibration model by using the data set samples to obtain the arrival time automatic calibration model;

S4: automatically locating a microseismic source:

S41: when microseismic events occur, collecting the microseismic signals by seismic stations respectively to obtain corresponding microseismic signal waveforms, and inputting the obtained microseismic signal waveforms into the arrival time automatic calibration model through channels, and automatically labeling the P-wave arrival times and the S-wave arrival times for the microseismic signal waveforms in each channel by the arrival time automatic calibration model;

at the same time, making preliminary assessment for the labeling in each channel in the microseismic events, excluding the channels without detecting the P-wave arrival times and the channels with the obviously mislabeling;

S42: constructing an isokinetic homogeneous isotropic velocity model based on a formula (4);

$$t_i - t_0 = \frac{\sqrt{(x_0 - x_i)^2 + (y_0 - y_i)^2 + (z_0 - z_i)^2}}{v}, \quad (4)$$

where $x_0$, $y_0$, $z_0$ is a microseismic event location, $t_0$ is a starting time of the microseismic events, $x_i$, $y_i$, $z_i$ is a coordinate of the i-th seismic station, $t_i$ is a time when the microseismic events occur and the P-wave is detected by the i-th seismic station, and v is an average propagation speed of the P-wave in mediums;

S43: solving the microseismic event location according to a formula (5) through minimizing an objective function to deduce a theoretical coordinate of the microseismic source using P-wave first arrival times;

$$F(x_0, y_0, z_0, t_0) = \sum_{i=1}^{n} w_i |r_i|^p, \quad (5)$$

where $$r_i = t_i - t_0 - \frac{\sqrt{(x_0 - x_i)^2 + (y_0 - y_i)^2 + (z_0 - z_i)^2}}{v},$$

$w_i$ is weight coefficient of observed values of each seismic station, n is a number of the seismic stations used to calibrate the P-wave arrival times, and p is a parameter, taken as 1 or 2;

S44: automatically optimizing channel combinations for locating the microseismic events;

S441: preliminarily selecting an initial channel combination for the microseismic event location, including: sorting the available channels according to an arrival time order and SNRs, and gradually expanding a search range according to channel sorting results; when a largest common subset in the search range meets the required number of the channels, the largest common subset is the initial channel combination;

S442: solving results of the microseismic event location based on the initial channel combination, in which the results of the microseismic event location have a unique solution, multiple solutions or no solution; (1)

when the results of the microseismic event location have the unique solution, determining the initial channel combination as an optimal combination, and fine-tuning the arrival times by P-wave velocity fine-tuning method of the channels; (2) when the results of the microseismic event location have the multiple solutions and the number of the channels is less than N0, sorting the remaining available channels according to the arrival time order and the SNRs, and selecting the required number of the channels from the largest common subset in the channel sorting results in sequence; then, adding the required number of the channels to generate the new channel combinations, and solving the results of the microseismic event location; and finally, repeating an above optimizing process until the results of the microseismic event location have the unique solution, and fine-tuning the arrival times by the P-wave velocity fine-tuning method of the channels; when the number of the channels is not less than N0, deleting the last channel and then searching for the next channel, in which a search process is same as the search process when the number of the channels is less than N0, repeating the above optimizing process until the results of the microseismic event location have no the multiple solutions, generating the new channel combinations and then locating and solving until the results of the microseismic event location have the unique solution; (3) when the results of the microseismic event location have no the solution, deleting the last channel according to the sorting results of the current channel combinations, then adding the next channel according to channel sorting results, so that the channel combinations contain N0 channels, then locating and solving again, repeating the optimizing process until the results of the microseismic event location have an effective solution, and finally, fine-tuning the arrival times by the P-wave velocity fine-tuning method of the channels, in which the P-wave velocity fine-tuning method of the channels includes: in each fine tuning, selecting the channel with a largest absolute value of deviation as a fine-tuned target channel, in which the fine-tuned step size is set to a fixed value or dynamically adjusted according to the deviation to obtain the updated arrival times, and then locating the microseismic events, only when the results of the microseismic event location have the unique solution and a maximum deviation between the theoretical arrival times and the actual arrival times is not increase, determining that the fine tuning is effective, otherwise, undoing the fine tuning, and ignoring the channel in the subsequent fine tuning; performing iterations and fine-tuning continuously, and when the maximum deviation is less than a specified threshold value, outputting an optimal solution.

Further, in the S41 of the S4, the number of the seismic stations is at least four.

Further, in the S2, hyperparameters of deep learning in the training the deep neural network model are set as follows: training times of 100, a batch size of 400, a learning rate of 0.01, and an attenuation rate of 0.8.

Further, in the S33 of the S3, hyperparameters of the transfer learning are set as follows: the training times of 40, the batch size of 400, the learning rate of 0.001, and the attenuation rate of 0.8.

Further, in the S31 of the S3, the SNRs are calculated by a ratio of signal power 2 seconds before arrival of the P-wave and the signal power 2 seconds after the arrival of the P-wave, and the data with wide SNR distribution is screened out as effective sample data by a formula (6);

$$SNR = 10 \lg \frac{p_s}{p_n}, \qquad (6)$$

where $p_s$ is the signal power, $p_n$ is noise power, lg is a logarithm based on 10, and power of a digital signal sequence $x(n)$ with a length of N is $$p = \frac{\sum_{n=0}^{N-1} x(n)^2}{N}.$$

Further, in the S43 of the S4, the formula (5) is solved by using a Particle Swarm Optimization (PSO) algorithm or a Powell algorithm.

Further, in the S442 of the S4, N0 is 6.

Further, in the S442 of the S4, the specified threshold value is 20 millisecond (ms).

According to the present application, the pre-training calibration model suitable for the mine microseismic events is established by using the massive seismic waveform data in a deep learning mode, and then is fine-tuned by a deep transfer learning method, the arrival time automatic calibration model for mine microseismic waves is established, so that robustness of the arrival time automatic calibration model to mine microseismic data is effectively improved, and finally, the mine microseismic events are automatically and accurately located based on the isokinetic homogeneous isotropic velocity model by using an optimization algorithm to deduce arrival time errors and through repeated iteration and fine-tuning. Since a scale of the mine is relatively small, extremely small arrival picking errors also have serious impacts on a series of subsequent data analysis. Therefore, although the model trained on seismic wave signals in the large-scale seismic data set may be directly used for processing of the mine microseismic signals, accuracy of the model trained on the seismic data set (source domain) for mine seismic data sets (target domain) is low due to great difference in geological and monitoring conditions between the seismic signals and mine seismic signals. To improve the accuracy, it is necessary to build hundreds of thousands of the mine seismic data sets to retrain the neural network. However, large-scale data labeling takes a lot of manpower and material resources and is inefficient. Therefore, constructing the arrival time automatic calibration model for the mine microseismic signals by the transfer learning method may not only effectively improve the location accuracy, but also save a lot of the manpower and the material resources and greatly reduce location cost. On the basis of the arrival time automatic calibration model, a small amount of the mine seismic data is fine-tuned, so as to make the network model more suitable for the mine seismic signals and further improve the location accuracy. Due to a heading face has a small drop height and an inconspicuous height change in a vertical space, seismic networks arranged in underground is less sensitive to a vertical direction in locating and solving, and the results of the microseismic event location have the multiple solutions, which leads that coordinate deviation in the vertical direction is greater than that in a horizontal direction. For the seismic source with unknown location, an optimization objective is to minimize a function value of the objective function as much as possible. As actual velocities of the P-wave in different propagation media are different, and average wave velocities of the seismic signals arriving at each seismic station are also different from the given expected wave velocity, it is necessary to repeatedly fine-tune to make the final deviation of all the selected channels within 20 ms. This process is not only time-consuming, but also difficult to be manually fine-tuned in strict accordance with the same standard. In order to avoid inefficient inaccurate manual operation in locating the seismic source, this application provides an automatic location optimization algorithm, including: increasing or decreasing the channels until the results of the microseismic event location become the unique solution from the multiple solutions or no solution, then fine-tuning the arrival times of the multiple channels in real time according to the theoretical and practical location errors, so as to reduce the location errors by iteration, and obtaining the optimal solution through multiple iterative calculation, in which during each iteration, the arrival time errors of each seismic station is deduced by calculating the theoretical location errors, then the specified channel is fine-tuned according to fine-tuning criterions, and whether current update is effective is judged according to overall errors, the optimal solution is output when meeting the specified threshold, so as to accurately locate the microseismic events. Compared with traditional methods, the application has a better anti-noise ability and better adaptability to the mine seismic data, may accurately pick the P-wave arrival times, automatically and intelligently locate the seismic source, and greatly shorten single-pass location time. Moreover, the application is beneficial to automatically locate the mine microseismic source second and to improve the location accuracy of the microseismic events and the microseismic monitoring efficiency.

DETAILED DESCRIPTION OF THE EMBODIMENTS

Figure 1:
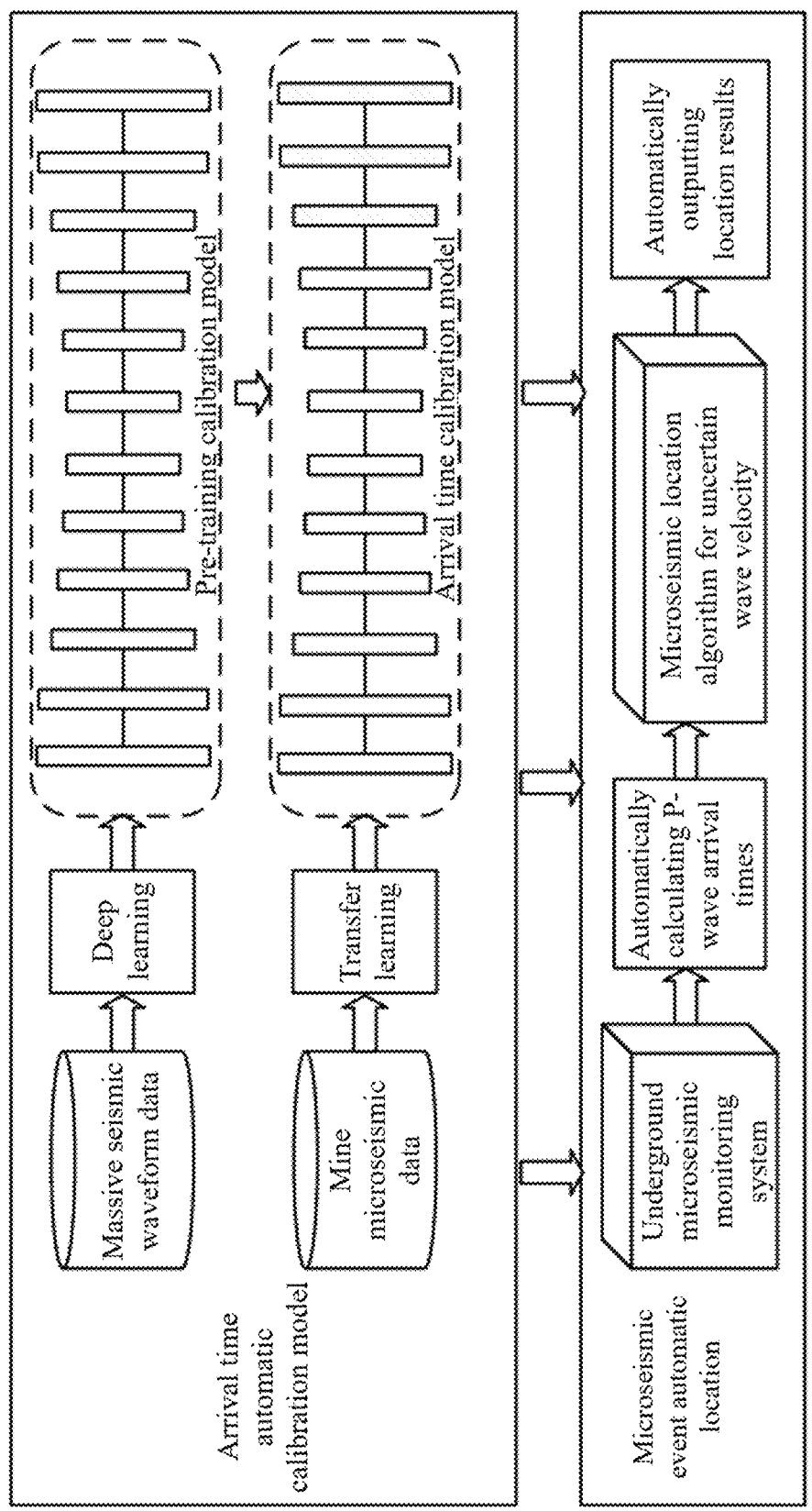
FIG. 1 is a network architecture diagram for automatically locating a mine microseismic source in the present application.
Figure 2:
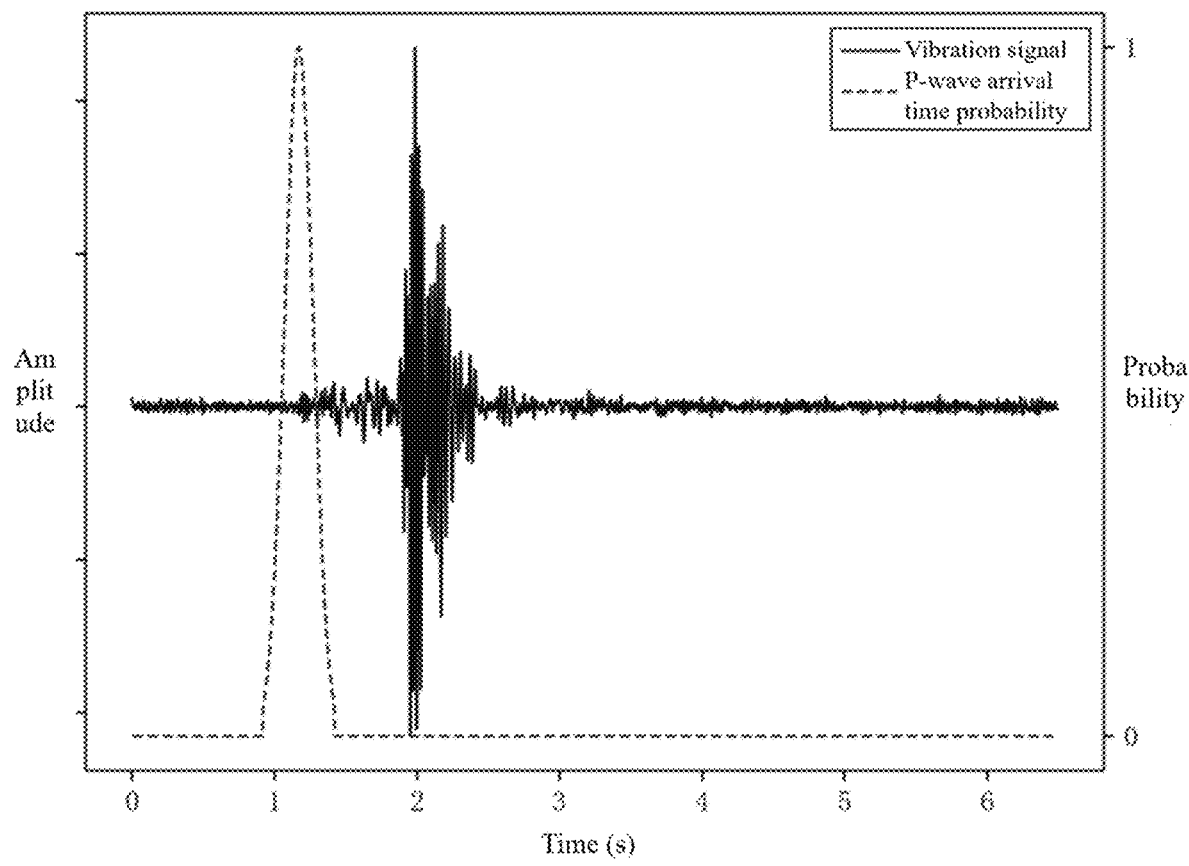
FIG. 2 is a graph of Gaussian distribution mask in the present application.
Figure 3:
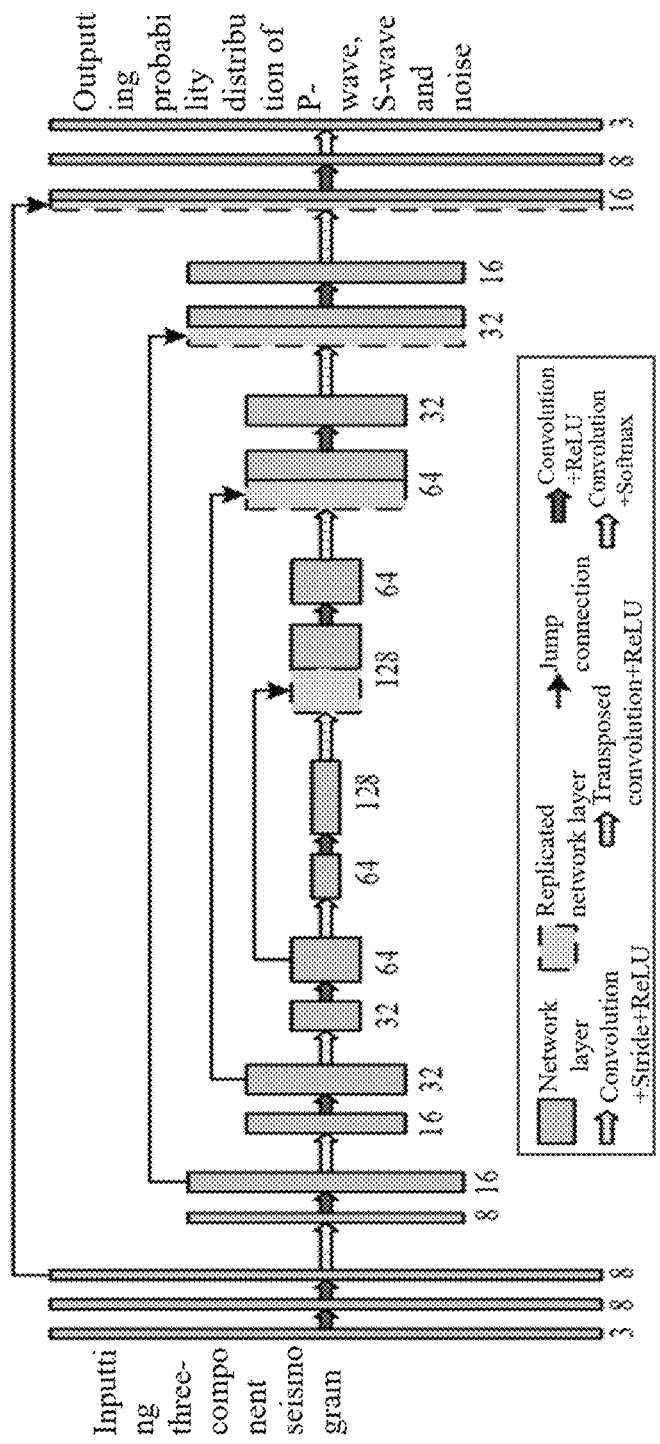
FIG. 3 is a network architecture diagram of a pre-training calibration model according to the present application.
Figure 4:
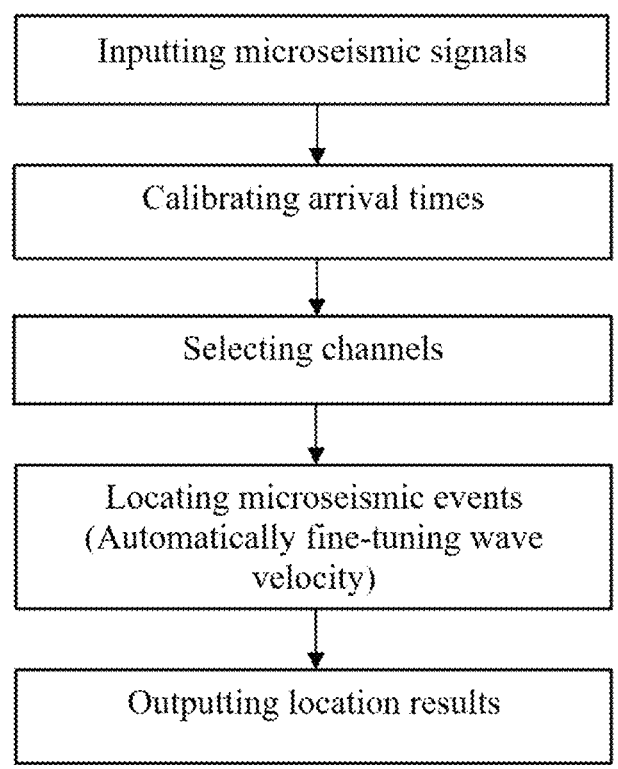
FIG. 4 shows a flowchart of a method for automatically locating a mine microseismic source.
Figure 5:
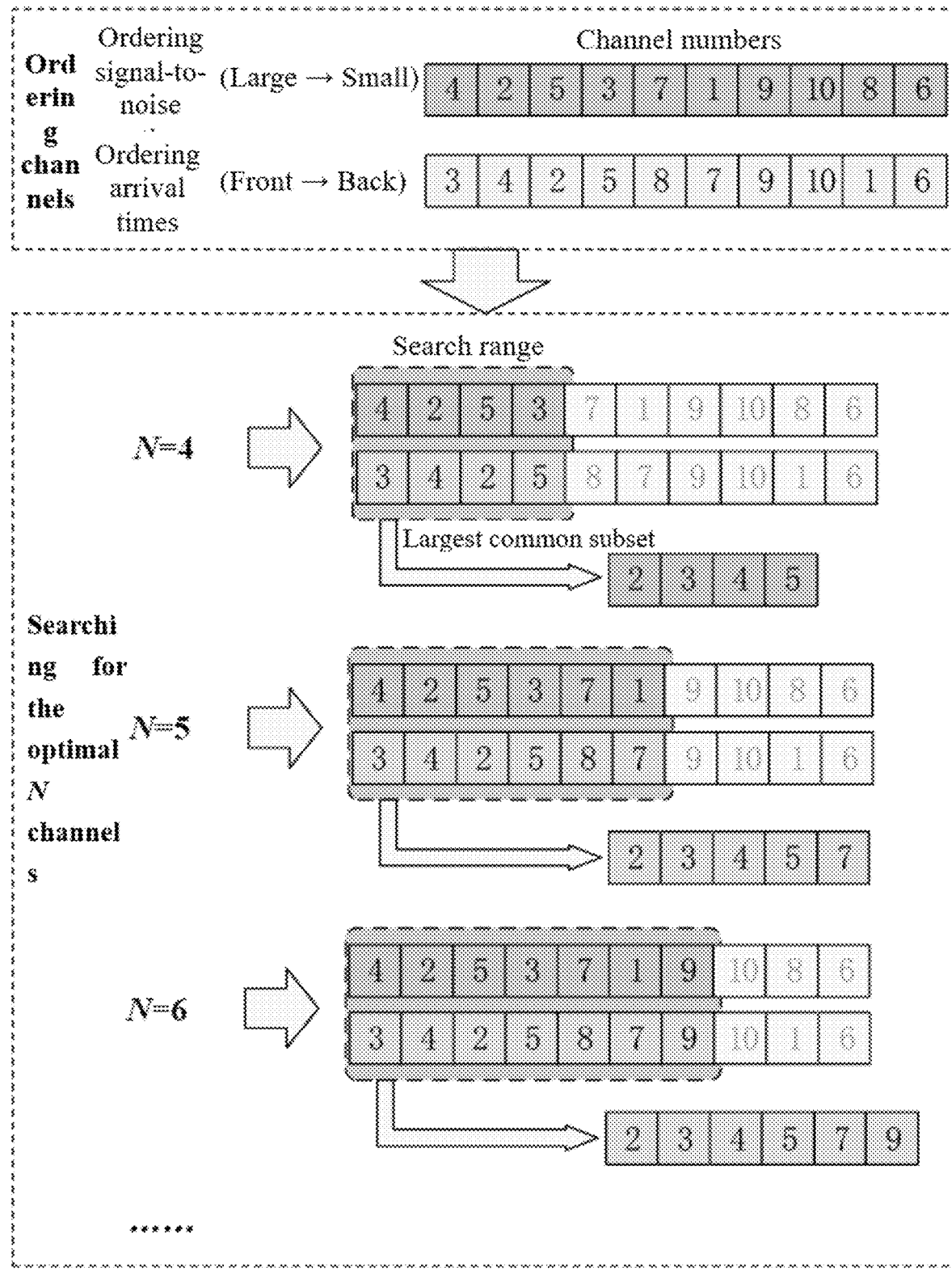
FIG. 5 shows a flowchart of a selection method for channel combinations in the present application.
Figure 6:
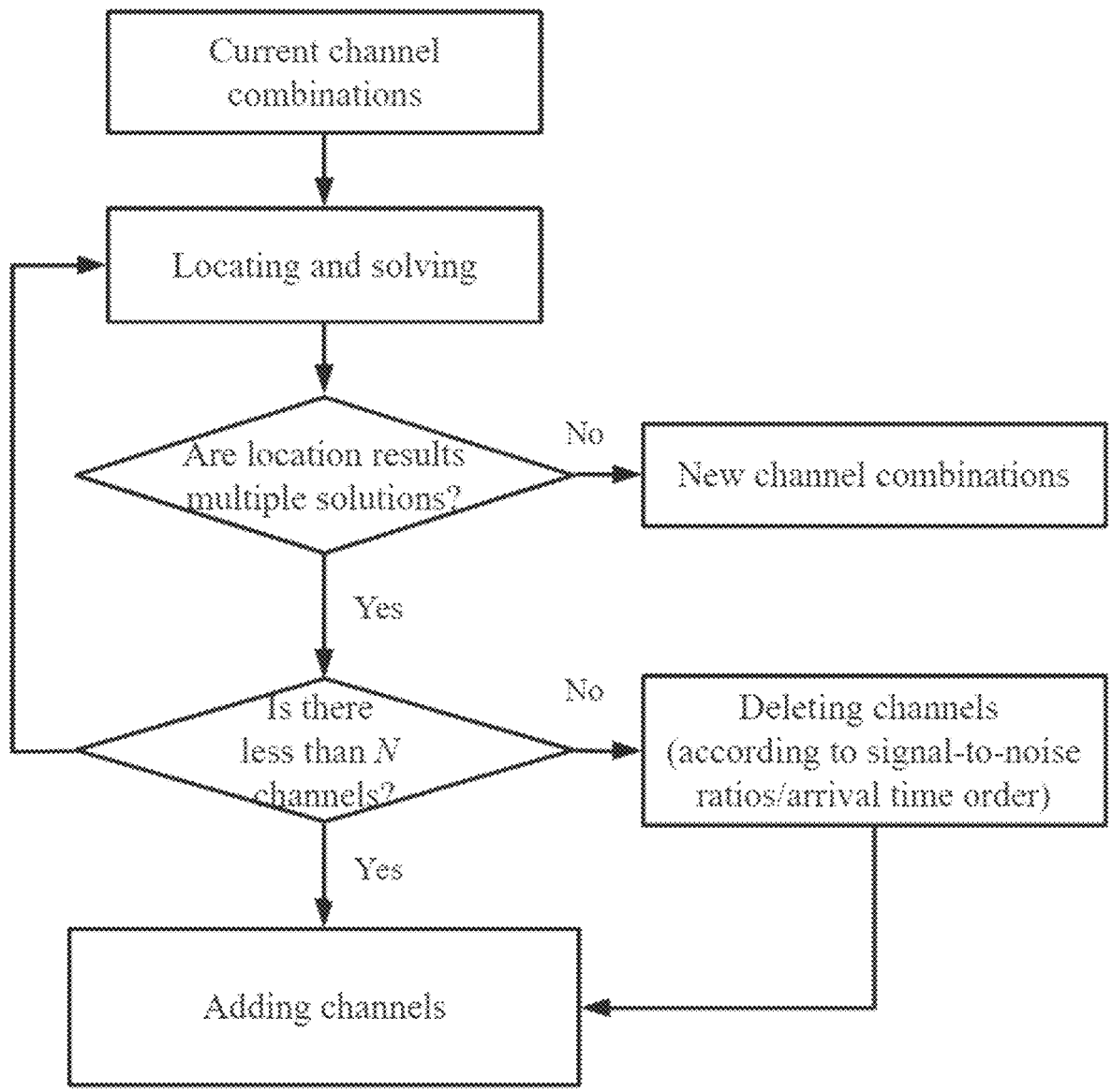
FIG. 6 shows a flowchart of solving when results of microseismic event location have multiple solutions in the present application.
Figure 7:
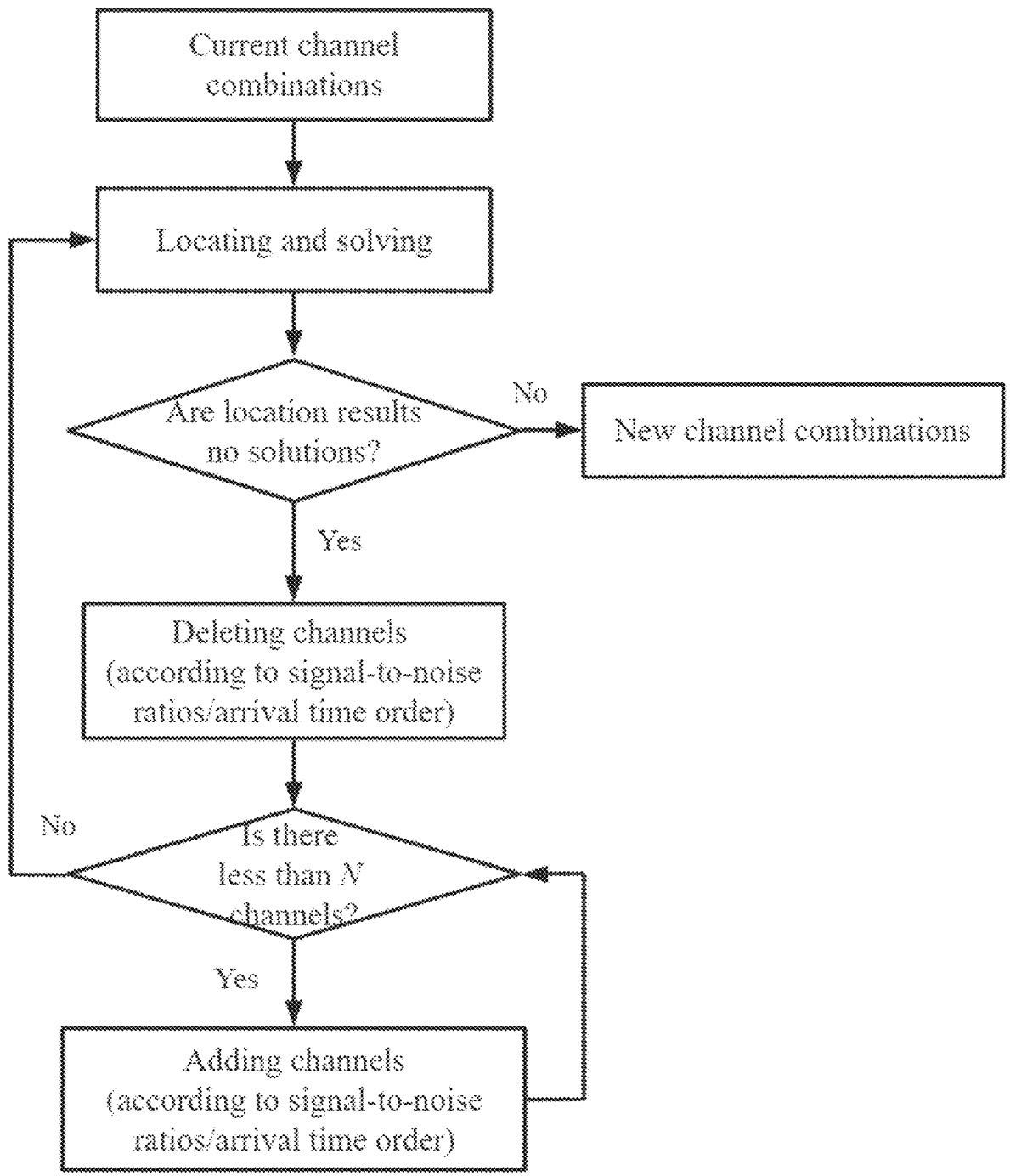
FIG. 7 shows a flowchart of solving when results of microseismic event location have no solution in the present application.
Figure 8:
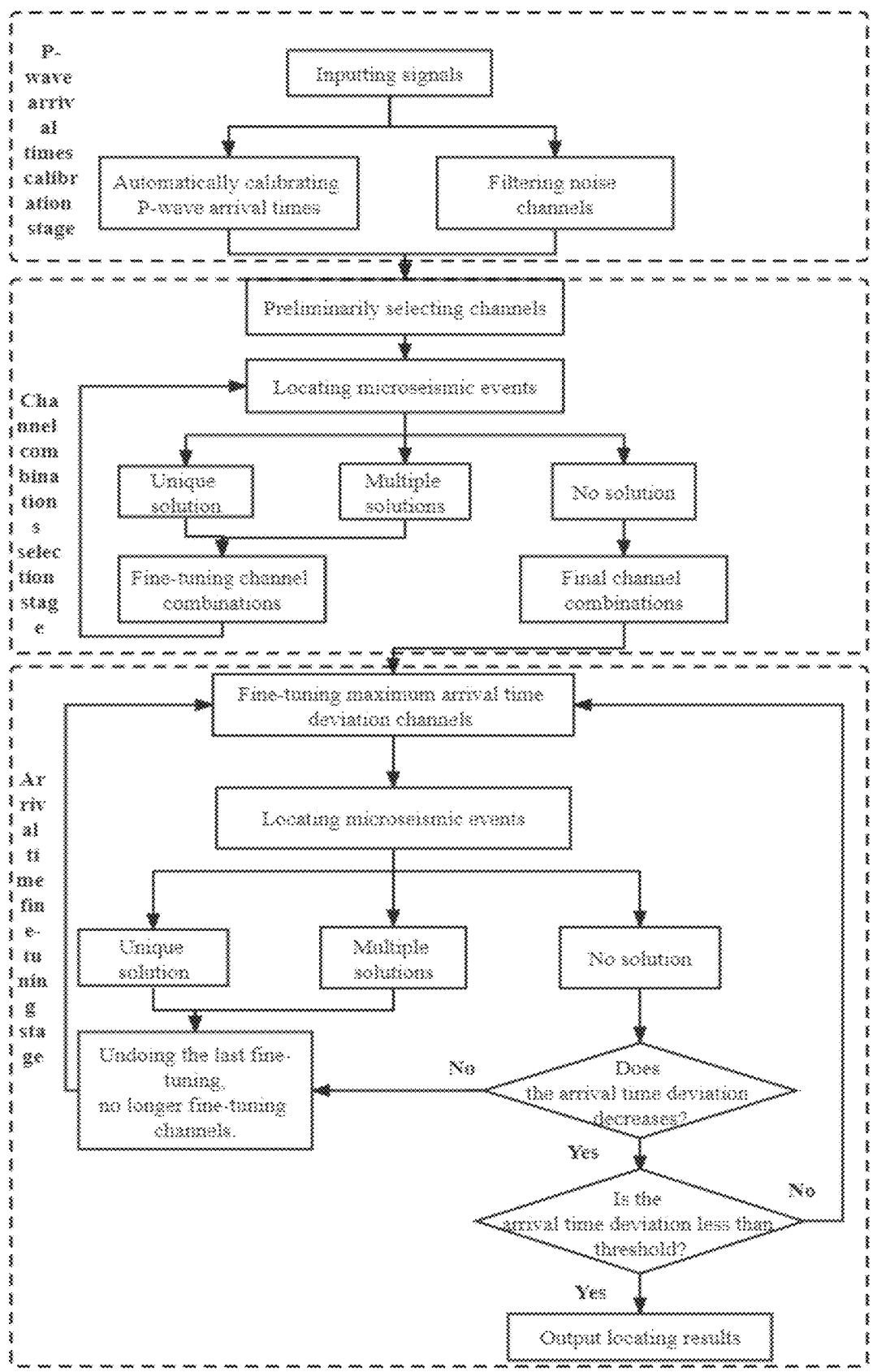
FIG. 8 shows a detailed flowchart of a method for automatically locating a mine microseismic source.

The application is further explained below.
As shown in FIG. 1-FIG. 8, the application provides a massive data-driven method for automatically locating a mine microseismic source, including:
S1: screening labeled seismic waveform data from a large-scale seismic data set STEAD containing seismic signals and non-seismic signals, and preprocessing each seismic waveform datum to construct a seismic wave calibration data set, in which the STEAD is the large-scale global seismic data set containing more than one million the seismic signals and three hundred thousand noise signals, in which an epicenter distance recorded by seismic stations is more than 300 kilometers (km) and a distance between the seismic stations and an epicenter is within 100 km; most of earthquakes have magnitudes less than 2.5, a waveform length is 1 minute (min), a sampling rate is 100 hertz (Hz), and a 1.0-4.5 Hz band-pass filter is used for preprocessing;

S2: randomly dividing the seismic waveform data in the seismic wave calibration data set into a training set, a verification set and a test set according to a preset proportion; optionally, the seismic waveform data in the training set: the seismic waveform data in the verification set: the seismic waveform data in the test set=17:1:2; then, establishing a deep neural network model based on a U-net structure; and training the deep neural network model by the training set to obtain a pre-training calibration model, in which the deep neural network model has four down-sampling phases and four up-sampling phases; the down-sampling phases are used to extract effective wave characters for arrival time calibration from original seismic data, the up-sampling phases are used to expand the wave characters and convert the wave characters into probability distribution of each P-wave arrival time, each S-wave arrival time and noise at each data point, and layers corresponding to the down-sampling phases and layers corresponding to the up-sampling phases are connected by jumps;

a size of convolution kernel is set to 7 and a step size of the convolution kernel is set to 4; in convolution operation, padding is performed before and after each layer, so that input sequences and output sequences have a same length, in a last layer of the deep neural network model, probabilities of the P-wave arrival times, the S-wave arrival times and the noise are output by a formula (1) and a Softmax normalized exponential function, in which a cross entropy loss function is used for training the deep neural network model by the training set, and a formula (2) is used for training the deep neural network model as well as the cross entropy loss function is ensured to be minimal;

$$q_i(x) = \frac{e^{z_i(x)}}{\sum_{k=1}^{3} e^{z_k(x)}}, \quad (1)$$

where i are set to 1, 2, 3, representing the noise, the P-wave arrival times as well as the S-wave arrival times, and Z(x) is unscaled values of the last layer;

$$H(p, q) = -\sum_{i=1}^{2}\sum_{x} p_i(x)\log q_i(x), \quad (2)$$

where p(x) is real probability distribution and q(x) is predictive probability distribution;

S3: using microseismic data of mine sites for transfer learning of the pre-training calibration model, and constructing an arrival time automatic calibration model suitable for mine microseismic signals to adapt to microseismic wave characters of underground engineering, including:

S31: manually labeling part of samples in the microseismic data of the mine sites, and constructing a microseismic signal sample data set containing the P-wave arrival times and the S-wave arrival times;

S32: constructing Gaussian distribution mask around manually labeled points by using a formula (3) to reduce impacts of mislabeling in the microseismic signal sample data set;

$$P(x) = \begin{cases} \frac{1}{\sigma\sqrt{2\pi}} e^{\frac{(x-\mu)^1}{2\sigma^2}}, & |x-\mu| \le d \\ 0 & |x-\mu| > d \end{cases} \quad (3)$$

where x is data points, $\mu$ is a manually labeled location of the arrival times, $\sigma$ is a standard deviation and is set to $1/\sqrt{2\pi}$, and 2d is a label width;

S33: as the number of constructed data set samples is relatively small, which leads to over-fitting, it is necessary to improve performance of the arrival time automatic calibration model by using a regularization method of data augmentation, including: performing the data augmentation on a microseismic wave calibration data set to obtain augmented the data set samples; then, increasing complexity of the data set samples by using random shifting and signal stacking; and finally, performing the transfer learning of the pre-training calibration model by using the data set samples to obtain the arrival time automatic calibration model;

S4: automatically locating a microseismic source:

S41: when microseismic events occur, collecting the microseismic signals by the seismic stations respectively to obtain corresponding microseismic signal waveforms, and inputting the obtained microseismic signal waveforms into the arrival time automatic calibration model through channels, and automatically labeling the P-wave arrival times and the S-wave arrival times for the microseismic signal waveforms in each channel by the arrival time automatic calibration model;

in order to effectively improve location accuracy and shorten location time, making preliminary assessment for the labeling in each channel in the microseismic events, excluding the channels without detecting the P-wave arrival times and the channels with the obviously mislabeling;

S42: constructing an isokinetic homogeneous isotropic velocity model based on a formula (4);

$$t_i - t_0 = \frac{\sqrt{(x_0 - x_i)^2 + (y_0 - y_i)^2 + (z_0 - z_i)^2}}{v}, \quad (4)$$

where $x_0$, $y_0$, $z_0$ is a microseismic event location, $t_0$ is a starting time of the microseismic events, $x_i$, $y_i$, $z_i$ is a coordinate of the i-th seismic station, $t_i$ is a time when the microseismic events occur and the P-wave is detected by the i-th seismic station, and v is an average propagation speed of the P-wave in mediums;

S43: solving the microseismic event location according to a formula (5) through minimizing an objective function to deduce a theoretical coordinate of the microseismic source using P-wave first arrival times;

$$F(x_0, y_0, z_0, t_0) = \sum_{i=1}^{n} w_i |r_i|^p, \text{ where} \quad (5)$$

$$r_i = t_i - t_0 - \frac{\sqrt{(x_0 - x_i)^2 + (y_0 - y_i)^2 + (z_0 - z_i)^2}}{v},$$

$w_i$ is weight coefficient of observed values of each seismic station, n is a number of the seismic stations used to calibrate the P-wave arrival times, and p is a parameter, taken as 1 or 2;

S44: automatically optimizing channel combinations for the microseismic event location;

S441: preliminarily selecting an initial channel combination for locating the microseismic events, usually, the seismic stations (channels) with the earlier P-wave arrival times are closer to microseismic events, the SNRs of the waveforms are higher, automatic calibration of the P-wave arrival times is more accurate, and possibility of significant change of a wave velocity field between the seismic stations (channels) and the microseismic events is less, which makes difference between theoretical calibration and actual calibration of the received waveforms of the seismic stations (channels) is smaller when locating the microseismic events; a selection method of the initial channel combination includes: sorting the available channels according to an arrival time order and the SNRs, and gradually expanding a search range according to channel sorting results; when a largest common subset in the search range meets the required number of the channels, the largest common subset is the initial channel combination;

S442: solving results of the microseismic event location based on the initial channel combination, in which the results of the microseismic event location have a unique solution, multiple solutions or no solution; (1) when the results of the microseismic event location have the unique solution, determining the initial channel combination as an optimal combination, and fine-tuning the arrival times by P-wave velocity fine-tuning method of the channels; (2) when the results of the microseismic event location have the multiple solutions, indicating that in calculating formula (4), constraint conditions are insufficient, because the seismic stations in the selected channel combinations form a straight line or distribute in a plane, and in this case, the channel combinations are automatically optimized, including as follows: when the number of the channels is less than N0, sorting the remaining available channels according to the arrival time order and the SNRs, and selecting the required number of the channels from the largest common subset in the channel sorting results in sequence; then, adding the required number of the channels to generate the new channel combinations, and solving the results of the microseismic event location; and finally, repeating an above optimizing process until the results of the microseismic event location have the unique solution, and fine-tuning the arrival times by the P-wave velocity fine-tuning method of the channels; when the number of the channels is not less than N0, deleting the last channel and then searching for the next channel, in which a search process is same as the search process when the number of the channels is less than N0, repeating the above optimizing process until the results of the microseismic event location have no the multiple solutions, generating the new channel combinations and then locating and solving until the results of the microseismic event location have the unique solution; (3) when the results of the microseismic event location have no the solution, indicating that in calculating the formula (4), too many constraint conditions or some constraint conditions are unreasonable, because the SNRs of selected information waveform signals are low, and the P-wave arrival times are difficult to identify, or because some selected channel microseismic rays pass through an abnormal area of the wave velocity field, resulting in the huge difference between the theoretical calibration and the actual calibration of the P-wave arrival times in the channels, and in this case, the channel combinations are automatically optimized, including as follows: deleting the last channel according to the sorting results of the current channel combinations, then adding the next channel according to the channel sorting results, so that the channel combinations contain N0 channels, then locating and solving again, repeating the optimizing process until the results of the microseismic event location have an effective solution, and finally, fine-tuning the arrival times by the P-wave velocity fine-tuning method of the channels, in which the P-wave velocity fine-tuning method of the channels includes: in each fine tuning, selecting the channel with a largest absolute value of deviation as a fine-tuned target channel, in which the fine-tuned step size is set to a fixed value or dynamically adjusted according to the deviation to obtain the updated arrival times, and then locating the microseismic events, only when the results of the microseismic event location have the unique solution and a maximum deviation between the theoretical arrival times and the actual arrival times is not increase, determining that the fine tuning is effective, otherwise, undoing the fine tuning, and ignoring the channel in the subsequent fine tuning; performing iterations and fine-tuning continuously, and when the maximum deviation is less than a specified threshold value, outputting an optimal solution.

In order to improve the location accuracy, in the S41 of the S4, the number of the seismic stations is at least four.

Optionally, in the S2, hyperparameters of deep learning in the training the deep neural network model are set as follows: training times of 100, a batch size of 400, a learning rate of 0.01, and an attenuation rate of 0.8.

Optionally, in the S33 of the S3, hyperparameters of the transfer learning are set as follows: the training times of 40, the batch size of 400, the learning rate of 0.001, and the attenuation rate of 0.8.

In order to make the arrival time automatic calibration model more robust, the SNRs of the waveforms is distributed as widely as possible. Therefore, in order to ensure sample data validity, in the S31 of the S3, it is necessary to analyze and calculate the SNRs of the microseismic signals, including: the SNRs are calculated by a ratio of signal power 2 seconds before arrival of the P-wave and the signal power 2 seconds after the arrival of the P-wave, and the data with wide SNR distribution is screened out as effective sample data by a formula (6);

$$SNR = 10 \lg \frac{p_s}{p_n}, \quad (6)$$

where $p_s$ is the signal power, $p_n$ is noise power, lg is a logarithm based on 10, and power of a digital signal sequence x(n) with a length of N is $$p = \frac{\sum_{n=0}^{N-1} x(n)^2}{N}.$$

Optionally, in the S43 of the S4, the formula (5) is solved by using a Particle Swarm Optimization (PSO) algorithm or a Powell algorithm.

In order to obtain the best location results, in the S442 of the S4, N0 is 6.

In order to improve the location accuracy, in the S442 of the S4, the specified threshold value is 20 ms.

According to the present application, the pre-training calibration model suitable for the mine microseismic events is established by using the massive seismic waveform data in a deep learning mode, and then is fine-tuned by a deep transfer learning method, the arrival time automatic calibration model for mine microseismic waves is established, so that robustness of the arrival time automatic calibration model to mine microseismic data is effectively improved, and finally, the mine microseismic events are automatically and accurately located based on the isokinetic homogeneous isotropic velocity model by using an optimization algorithm to deduce arrival time errors and through repeated iteration and fine-tuning. Since a scale of the mine is relatively small, extremely small arrival picking errors also have serious impacts on a series of subsequent data analysis. Therefore, although the model trained on seismic wave signals in the large-scale seismic data set may be directly used for processing of the mine microseismic signals, accuracy of the model trained on the seismic data set (source domain) for mine seismic data sets (target domain) is low due to great difference in geological and monitoring conditions between the seismic signals and mine seismic signals. To improve the accuracy, it is necessary to build hundreds of thousands of the mine seismic data sets to retrain the neural network. However, large-scale data labeling takes a lot of manpower and material resources and is inefficient. Therefore, constructing the arrival time automatic calibration model for the mine microseismic signals by the transfer learning method may not only effectively improve the location accuracy, but also save a lot of the manpower and the material resources and greatly reduce location cost. On the basis of the arrival time automatic calibration model, a small amount of the mine seismic data is fine-tuned, so as to make the network model more suitable for the mine seismic signals and further improve the location accuracy. Due to a heading face has a small drop height and an inconspicuous height change in a vertical space, seismic networks arranged in underground is less sensitive to a vertical direction in locating and solving, and the results of the microseismic event location have the multiple solutions, which leads that coordinate deviation in the vertical direction is greater than that in a horizontal direction. For the seismic source with unknown location, an optimization objective is to minimize a function value of the objective function as much as possible. As actual velocities of the P-wave in different propagation media are different, and average wave velocities of the seismic signals arriving at each seismic station are also different from the given expected wave velocity, it is necessary to repeatedly fine-tune to make the final deviation of all the selected channels within 20 ms. This process is not only time-consuming, but also difficult to be manually fine-tuned in strict accordance with the same standard. In order to avoid inefficient inaccurate manual operation in locating the seismic source, this application provides an automatic location optimization algorithm, including: increasing or decreasing the channels until the results of the microseismic event location become the unique solution from the multiple solutions or no solution, then fine-tuning the arrival times of the multiple channels in real time according to the theoretical and practical location errors, so as to reduce the location errors by iteration, and obtaining the optimal solution through multiple iterative calculation, in which during each iteration, the arrival time errors of each seismic station is deduced by calculating the theoretical location errors, then the specified channel is fine-tuned according to fine-tuning criterions, and whether current update is effective is judged according to overall errors, the optimal solution is output when meeting the specified threshold, so as to accurately locate the microseismic events. Compared with traditional methods, the application has a better anti-noise ability and better adaptability to the mine seismic data, may accurately pick the P-wave arrival times, automatically and intelligently locate the seismic source, and greatly shorten single-pass location time. Moreover, the application is beneficial to automatically locate the mine microseismic source second and to improve the location accuracy of the microseismic event and the microseismic monitoring efficiency.

What is claimed is:

1. A data-driven method for automatically locating a mine microseismic source, comprising:

S1: screening a seismic waveform data from a seismic data set containing seismic signals and non-seismic signals, and preprocessing the seismic waveform data to construct a seismic wave calibration data set;

S2: randomly dividing the seismic waveform data in the seismic wave calibration data set into a training set, a verification set and a test set according to a preset proportion; then, establishing a deep neural network model with a U-net structure; and training the deep neural network model by the training set to obtain a pre-training calibration model, wherein the deep neural network model has four down-sampling phases and four up-sampling phases, wherein the four down-sampling phases are used to extract effective wave characters for arrival time calibration from original seismic data, the four up-sampling phases are used to expand the wave characters and convert the wave characters into probability distributions corresponding to P-wave arrival time, S-wave arrival time and noise at corresponding data points, and layers corresponding to the four down-sampling phases and layers corresponding to the four up-sampling phases are connected by jumps;

a size of a convolution kernel is set to 7 and a step size of the convolution kernel is set to 4; in a convolution operation, padding is performed before and after each layer, so that input sequences and output sequences have a same length; in a last layer of the deep neural network model, probabilities of the P-wave arrival times, the S-wave arrival times and the noise are output by a Softmax normalized exponential function defined by formula (1), wherein a cross entropy loss function defined by formula (2) is used for training the deep neural network model by the training set, and the cross entropy loss function is ensured to be minimal;

$$q_i(x) = \frac{e^{z_i(x)}}{\sum_{k=1}^{3} e^{z_k(x)}}, \quad (1)$$

wherein $Z_i(x)$ is unscaled values of the last layer, and x is data points, wherein i is set to 1, 2, 3, with i=1 representing the noise, i=2 representing the P-wave arrival times, and i=3 representing the S-wave arrival times, and;

$$H(p, q) = -\sum_{i=1}^{2} \sum_{x} p_i(x) \log q_i(x), \quad (2)$$

wherein $p_i(x)$ is real probability distribution and $q_i(x)$ is predictive probability distribution, wherein i is set to 1, 2, 3, with i=1 representing the noise, i=2 representing the P-wave arrival times, and i=3 representing the S-wave arrival times, and x is data points;

S3: using microseismic data of mine sites for transfer learning of the pre-training calibration model, and constructing an arrival time automatic calibration model suitable for mine microseismic signals to adapt to microseismic wave characters of underground engineering, comprising:

S31: manually labeling a part of samples in the microseismic data of the mine sites, and constructing a microseismic signal sample data set containing the P-wave arrival times and the S-wave arrival times;

S32: constructing a Gaussian distribution mask around manually labeled samples by using a formula (3) to reduce impacts of mislabeling in the microseismic signal sample data set;

$$P(x) = \begin{cases} \frac{1}{\sigma\sqrt{2\pi}} e^{-\frac{(x-\mu)^2}{2\sigma^2}} &, |x-\mu| \leq d \\ 0 &, |x-\mu| > d \end{cases} \quad (3)$$

wherein x is data points, μ is a manually labeled location of the P-wave arrival times and the S-wave arrival times, σ is a standard deviation and is set to $1/\sqrt{2\pi}$, and 2d is a label width; and S33: performing a data augmentation process on a microseismic wave calibration data set to obtain augmented data set samples; then, increasing complexity of the augmented data set samples by using random shifting and signal stacking; and performing the transfer learning of the pre-training calibration model by using the augmented data set samples to obtain the arrival time automatic calibration model; and S4: automatically locating the mine microseismic source, comprising:

S41: when microseismic events occur, collecting the mine microseismic signals by seismic stations to obtain corresponding microseismic signal waveforms, and inputting the obtained microseismic signal waveforms into the arrival time automatic calibration model through channels corresponding to the respective seismic stations, and automatically labeling the P-wave arrival times and the S-wave arrival times for the microseismic signal waveforms in each channel by the arrival time automatic calibration model;

at the same time, making preliminary assessment for the labeling in each channel in the microseismic events, excluding the channels without detecting the P-wave arrival times and the channels with the mislabeling in the microseismic signal waveforms;

S42: constructing an isokinetic homogeneous isotropic velocity model based on a formula (4);

$$t_i - t_0 = -\frac{\sqrt{(x_0 - x_i)^2 + (y_0 - y_i)^2 + (z_0 - z_i)^2}}{v}, \quad (4)$$

wherein $x_0$, $y_0$, $z_0$ is a microseismic event location, $t_0$ is a starting time of the microseismic events, $x_i$, $y_i$, $z_i$ is a coordinate of an i-th seismic station, $t_i$ is a time when the microseismic events occur and the P-wave arrival times is detected by the i-th seismic station, and v is an average propagation speed of the P-wave arrival times in mediums;

S43: solving the microseismic event location according to a formula (5) through minimizing an objective function to deduce a theoretical coordinate of the mine microseismic source by using P-wave first arrival times;

$$F(x_0, y_0, z_0, t_0) = \sum_{i=1}^{n} w_i |r_i|^p, \quad (5)$$

wherein $$r_i = t_i - t_0 - \frac{\sqrt{(x_0 - x_i)^2 + (y_0 - y_i)^2 + (z_0 - z_i)^2}}{v},$$

$w_i$ is weight coefficient of observed values of each of the seismic stations, n is a number of the seismic stations used to calibrate the P-wave arrival times, and p is a parameter, taken as 1 or 2, $x_0$, $y_0$, $z_0$ represent the coordinates of the microseismic event location, $t_0$ represents the starting time of the microseismic events, $x_i$, $y_i$, $z_i$ represent the coordinates of the i-th seismic station, and $t_i$ represent the time when the microseismic events occurs at the i-th seismic station;

S44: automatically optimizing channel combinations for the microseismic event location, comprising;

S441: preliminarily selecting an initial channel combination for the microseismic event location, comprising: determining signal-to-noise ratios (SNRs) of the microseismic signal waveforms in the channels, sorting the channels according to an arrival time order and the SNRs, and gradually expanding a search range according to channel sorting results; when a largest common subset in the search range meets a required number of the channels, the largest common subset is the initial channel combination; and S442: solving results of the microseismic event location based on the initial channel combination, wherein the results of the microseismic event location have a unique solution, multiple solutions or no solution; (i) when the results of the microseismic event location have the unique solution, determining the initial channel combination as an optimal combination, and fine-tuning the P-wave arrival times velocity fine-tuning method of the channels; (ii) when the results of the microseismic event location have the multiple solutions and a number of the channels is less than $N_0$, wherein $N_0$=6 represents the number of the channels, sorting the channels according to the arrival time order and the SNRs, and selecting the required number of the channels from the largest common subset in the channel sorting results in sequence; then, adding the required number of the channels to generate the channel combinations, and solving the results of the microseismic event location; and repeating an optimizing process of the step S44 until the results of the microseismic event location have the unique solution, and fine-tuning the P-wave arrival times velocity fine-tuning method of the channels; when the number of the channels is not less than $N_0$, deleting a last channel and then searching for a next channel, wherein a search process is same as a search process when the number of the channels is less than $N_0$, repeating the optimizing process of the step S44 until the results of the microseismic event location do not have the multiple solutions, generating the channel combinations and then locating and solving until the results of the microseismic event location have the unique solution; (iii) when the results of the microseismic event location do not have the solution, deleting the last channel according to the channel sorting results of current channel combinations, then adding the next channel according to the channel sorting results, so that the channel combinations contain $N_0$ channels, then locating and solving again, repeating the optimizing process of the step S44 until the results of the microseismic event location have an effective solution, and fine-tuning the arrival times by the P-wave velocity fine-tuning method of the channels, wherein the P-wave arrival times velocity fine-tuning method of the channels comprises: in each fine tuning, selecting a channel with a largest absolute value of deviation as a fine-tuned target channel, wherein the fine-tuning is set to a fixed value or dynamically adjusted according to the largest absolute value of deviation of a selected channel to obtain updated P-wave arrival times, and then locating the microseismic events, only when the results of the microseismic event location have the unique solution and a maximum deviation between theoretical arrival times and actual arrival times does not increase, determining that the fine tuning is effective, otherwise, undoing the fine tuning, and ignoring the selected channel in the subsequent fine tuning; performing iterations and fine-tuning continuously, and when the maximum deviation is less than a specified threshold value, outputting an optimal solution.

2. The data-driven method for automatically locating the mine microseismic source according to claim 1, wherein in the step S41 of the step S4, the number of the seismic stations is at least four.

3. The data-driven method for automatically locating the mine microseismic source according to claim 2, wherein in the step S2, hyperparameters of deep learning in the training the deep neural network model are set as follows: training times of 100, a batch size of 400, a learning rate of 0.01, and an attenuation rate of 0.8.

4. The data-driven method for automatically locating the mine microseismic source according to claim 3, wherein in the step S33 of the step S3, hyperparameters of the transfer learning are set as follows: the training times of 40, the batch size of 400, the learning rate of 0.001, and the attenuation rate of 0.8.

5. The data-driven method for automatically locating the mine microseismic source according to claim 4, wherein in the step S31 of the step S3, the SNRs of the microseismic signal waveforms in the channels are calculated by a ratio of signal power 2 seconds before the P-wave arrival times and the signal power 2 seconds after the P-wave arrival times, and the SNRs of the microseismic signal waveforms in the channels are screened out as effective sample data by a formula (6);

$$SNR = 10\lg\frac{p_s}{p_n}, \quad (6)$$

wherein $p_s$ is the signal power, $p_n$ is noise power, lg is a logarithm based on 10, and power of a digital signal sequence x(n) with a length of N is $$p = \frac{\sum_{n=0}^{N-1} x(n)^2}{N}.$$

6. The data-driven method for automatically locating the mine microseismic source according to claim 5, wherein in the step S43 of the step S4, the formula (5) is solved by using a Particle Swarm Optimization (PSO) algorithm or a Powell algorithm.

7. The data-driven method for automatically locating the mine microseismic source according to claim 6, wherein in the step S442 of the step S4, $N_0$ is 6.

8. The data-driven method for automatically locating the mine microseismic source according to claim 7, wherein in the step S442 of the step S4, the specified threshold value is 20 ms.

* * * * *